United States Patent Office 3,475,447
Patented Oct. 28, 1969

1

3,475,447
N,N-DISUBSTITUTED BENZIMIDAZOLE - 2-
CARBONAMIDINES AND A PROCESS FOR
THEIR PREPARATION
Eva Lea Samuel, Bentleigh, Victoria, Australia, assignor
to Monsanto Chemicals (Australia) Limited, West
Footscray, Victoria, Australia, a company of Australia
No Drawing. Filed Sept. 18, 1967, Ser. No. 668,636
Claims priority, application Australia, Sept. 19, 1966,
11,198/66
Int. Cl. C07d 49/38; A01n 9/22
U.S. Cl. 260—309.2                            7 Claims

ABSTRACT OF THE DISCLOSURE

N,N-disubstituted benzimidazole-2-carbonamidines of the formulua:

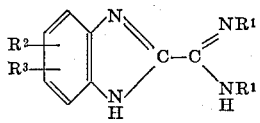

wherein $R^1$ is selected from the group consisting of alkyl of not more than twelve carbon atoms, thienyl, furfuryl, phenyl and substituted phenyl of not more than two substituents selected from the group consisting of chlorine, bromine, nitro, alkyl of not more than four carbon atoms and alkoxy of not more than four carbon atoms; and wherein $R^2$ and $R^3$ are independently selected from the group consisting of hydrogen, chlorine, bromine, nitro, alkyl of not more than four carbon atoms and alkoxy of not more than four carbon atoms. These carbonamidines are useful for combatting insects.

---

This invention provides new organic compounds which are useful inter alia as biological toxicants, said compounds being N,N-disubstituted benzimidazole-2-carbonamidines of the structural formula:

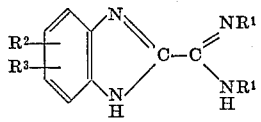

wherein $R^1$ are selected from the group consisting of alkyl of not more than twelve carbon atoms, thienyl, furfuryl, phenyl and substituted phenyl of not more than two substituents selected from the group consisting of chlorine, bromine, nitro, alkyl of not more than four carbon atoms and alkoxy of not more than four carbon atoms; and wherein $R^2$ and $R^3$ are independently selected from the group consisting of hydrogen, chlorine, bromine, nitro, alkyl of not more than four carbon atoms and alkoxy of not more than four carbon atoms.

Examples of specific compounds of the above structural formula which are useful for the purpose of the invention are N,N - dimethyl - 2 - benzimidazole carbonamidine; N,N-dimethyl-2 - (5 - chlorobenzimidazole) carbonamidine; N,N-diethyl-2-(5-chloro - 6 - nitrobenzimidazole) carbonamidine; N,N-di-n-dodecyl-2-benzimidazole carbonamidine; N,N - di - n - dodecyl - 2 - (5 - methoxybenzimidazole) carbonamidine; N,N-bis(p-methoxyphenyl)-2-benzimidazole carbonamidine; N,N-bis(3′,4′-dichlorophenyl)-2-benzimidazole carbonamidine; N,N-dithienyl-2-(5-methylbenzimidazole) carbonamidine; and N,N-difurfuryl-2-benzimidazole carbonamidine.

Compounds of the above formula can be prepared by the reaction of a trihalomethylbenzimidazole on a primary amine under basic conditions, as illustrated by the following equation:

2

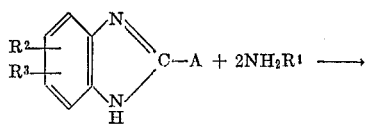

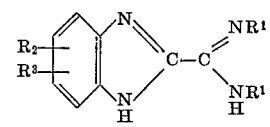

wherein $R^1$, $R^2$ and $R^3$ are as defined above, and wherein A represents a group selected from trichloromethyl, monochlorodifluoromethyl and monofluorodichloromethyl. In general, in practice, the trihalomethyl benzimidazole is added slowly to the amine dissolved in a solvent, while the solution is stirred continuously. The amine may be used in excess to achieve satisfactory basic conditions, or alternatively a tertiary organic base, such as triethylamine may be used. An acid medium is to be avoided as it will result in the ready formation of undesired amide.

Suitable solvents for carrying out the process of the present invention are water and lower alkanols, such as methanol. Generally, better yields result with an alkanol. Low temperatures are usually necessary for optimum yields, as relatively high temperatures result in some hydrolysis with formation of undesired amide. The rate of addition of the benzimidazole is therefore adjusted to prevent too high a temperature resulting from the exothermic reaction.

The desired carbonamidine usually precipitates readily from an aqueous solution and can then be recovered by filtration, however, with an alcohol solution it is necessary to dilute the solution with water and precipitate the desired product by basification with sodium carbonate. After separation, the desired product can be purified, if necessary, by conventional procedures.

The following practical examples are illustrative but not limitative of the process of the invention.

EXAMPLE 1

2-trichloromethyl benzimidazole (1.2 g.) was added slowly while stirring to a solution of methylamine (1.5 g.) in water (10 ml.). The 2-trichloromethyl benzimidazole dissolved rapidly and the desired product precipitated out. N,N-dimethyl-2-benzimidazole carbonamidine was filtered off as prismatic crystals, M.P. 270° C., in 94% yield.

Microanalysis gave the following: Found: C, 64.1; H, 6.3; N, 29.8%. $C_{10}H_{12}N_4$ requires: C, 63.8; H, 6.4; N, 29.8%.

EXAMPLE 2

A reaction carried out by the method described in Example 1, using 5-chloro-2-trichloromethyl benzimidazole (1.4 g.), methylamine (3.0 g.) and 20 ml. of water gave a 90% yield of N,N-dimethyl-2-(5-chlorobenzimidazole) carbonamidine, melting point 265° C.

Microanalysis gave the following: Found: C, 54.2; H, 5.0; N, 24.7; Cl, 16.5%. $C_{10}H_{11}N_4Cl$ requires: C, 54.0; H, 4.9; N, 25.1; Cl, 16.0%.

EXAMPLE 3

Dodecylamine (3.7 g.) and triethylamine (3.0 g.) were dissolved in absolute alcohol (75 ml.). 2-trichloromethyl benzimidazole (2.4 g.) was added slowly. An oily product precipitated which slowly solidified. Crude, N,N-di-n-dodecyl-2-benzimidazole carbonamidine was recrystallized from methanol to give white crystals, melting at 70° C. in 50% yield.

Microanalysis gave the following: Found: C, 77.0; H, 11.0; N, 11.6%. $C_{32}H_{53}N_4$ requires: C, 77.3; H, 11.4; N, 11.3%.

EXAMPLE 4

2-trichloromethyl benzimidazole (2.4 g.) was added to a solution of furfurylamine in methanol (20 ml.). A strongly exothermic reaction took place. After two hours the mixture was quenched in water and basified with sodium carbonate solution (10%) and a solid material precipitated. This was extracted into cyclohexane and the solution on evaporation gave N,N-difurfuryl-2-benzimidazole carbonamidine in 40% yield, melting point 125° C.

Microanalysis of the purified product gave the following: Found: C, 67.6; H, 5.0; N, 17.7%. $C_{18}H_{16}N_4O_2$ requires: C, 67.5; H, 5.0; N, 17.5%.

EXAMPLE 5

Example 4 was repeated using water (20 ml.) to replace the methanol. N,N-difurfuryl-2-benzimidazole carbonamidine was precipitated and filtered off to give a yield of 15%.

EXAMPLE 6 p-Anisidine (1.2 g.) and 2-trichloromethyl benzimidazole (1.2 g.) were allowed to stand in methanol (20 ml.) and then quenched into water. Basification with sodium carbonate solution (10%) precipitated crude N,N-bis(p-methoxyphenyl)-2-benzimidazole carbonamidine which was recrystallized from cyclohexane to give needles, M.P. 155° C. in 30% yield.

Micronalysis of the purified product gave the following: Found: C, 70.8; H, 5.5; N, 15.3%. $C_{22}H_{20}N_4O_2$ requires: C, 70.9; H, 5.4; N, 15.1%.

EXAMPLE 7

2-trichloromethylbenzimidazole (9.4 g.) and 3,4-dichloroaniline (13 g.) were added to absolute alcohol and allowed to stand at room temperature for four days. Addition of a small amount of water gave oily impurities which were removed by filtration and addition of further water gave N,N-bis(3',4'-dichlorophenyl)-2-benzimidazole carbonamidine in 25% yield, melting above 300° C.

Microanalysis gave the following: Found: C, 53.4; H, 3.0; N, 12.5; Cl, 31.0%. $C_{20}M_{12}N_4Cl$ requires: C, 53.4; H, 2.7; N, 12.4; Cl, 31.5%.

The compounds of the present invention are useful as biological toxicants. They are particularly useful inter alia for the elimination of insect pests, for example, N-N-dimethyl-2-benzimidazole carbonamidine is toxic to the house fly (musca domestica) at 10 μg. The present compounds are also useful as fungicides, for example, N,N-dimethyl-2-(5-chlorobenzimidazole) carbonamidine completely eliminates the plant fungus *Venturia inaequalis* at 10 p.p.m.

In combating insect pests, any of the specified active compound/s either per se or insecticidal compositions comprising any of said active compound/s are applied to the insect pests or to their environment in a lethal or toxic amount. This can be done by distributing the specified active compound/s or an insecticidal composition comprising same in or about an infested environment or in or about an environment which the insect pests frequent, e.g. agricultural soil or other growth media or other media attractable to the pests for habitational or sustenance or propagational purposes, in any conventional fashion which permits the insect pests to be subject to the insecticidal action of the specified active compound/s. Such distribution can be brought about by applying sprays or particulate solid compositions to a surface infested with the insect pests or attractable to the pests, as for example, the surface of an agricultural soil or other habitat media such as the above-ground surface of host plants by any of the conventional methods, e.g. power dusters, boom and hand sprayers, and spray dusters. Also for sub-surface application such distribution can be carried out by simply mixing the specified active compound/s per se or insecticidal spray or particulate solid composition comprising same with the infested environment or with the environment the insect pests frequent, or by employing a liquid carrier for the specified active compound/s to accomplish sub-surface penetration and impregnation therein.

Thus, although the specified active compound/s are useful per se in combating insect pests, it is preferable in practicing the method of the present invention, that the specified active compound/s be applied to the pests or to the environment of the pests in a dispersed form in a suitable extending agent. In this specification the term 'dispersed' is used in its widest possible sense, thus, the term means that particles of the specified active compound/s may be molecular in size and held in true solution in a suitable organic solvent; the term also means that the particles may be colloidal in size and distributed throughout a liquid phase in the form of suspensions or emulsions or in the form of particles held in suspension by surface-active agents of a non-ionizing character; the term also means that the particles can be distributed in a semi-solid viscous carrier such as petroleum or other ointment base of a non-ionizing character in which they may be actually dissolved in the semi-solid or held in suspension in the semi-solid with the aid of suitable non-ionizing surface-active agents; the term also means that the particles may be mixed with and distributed throughout a solid carrier providing a mixture in particulate form, e.g. pellets, granules, powders, or dusts; and the term also means that the particles can be in mixtures which are suitable for use as aerosols including solutions, suspensions, or emulsions of the specified active compound in a carrier such as dichlorodifluoromethane and like fluorochloroalkanes or mixtures of these and/or with other substances and which boil below room temperature at atmospheric pressure. In this specification the expression 'extending agent' includes any and all of those substances in which the specified active compound is dispersed, including, therefore, the solvents of a true solution, the liquid phase of suspensions, emulsions or aerosols, the semi-solid carrier of ointments, the solid phase of particulate solids, e.g. pellets, granules, dusts and powders, and conditioning agents e.g. surfactants.

The concentration of the specified active compound/s employed according to the invention in combatting insect pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions, or aerosols) the concentration of the specified active compound employed to supply the desired dosage generally will be in the range of 0.001 to 50 percent by weight. When the extending agent is a semi-solid or solid, the concentration of the specified active compound employed to supply the desired dosage generally will be in the range of 0.01 to 25 percent by weight.

There are a large number of organic liquids which can be used for the preparation of solutions, suspensions or emulsions of the specified active compound. For example, isopropyl ether, acetone, methyl ethyl ketone, octanone, dioxane, cyclohexanone, carbon tetrachloride, ethylene dichloride, tetrachloroethane, hexane, heptane, and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent, a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, disoxane, isopropyl ether, and the like. In certain instances, it is advantageous to employ a mixture of organic liquids as the extending agent, e.g. an aromatic hydrocarbon and an aliphatic ketone.

When the specified active compounds are to be supplied to the insect pests or to the environment of the pests as aerosols, it is convenient to dissolve said compounds in a suitable solvent and disperse the resulting solution in dichlorodifluoromethane or like chlorofluoroalkane or mixtures of these with or without other aerosol dispersants which boil below room temperature at atmospheric pressure. In this connection the invention provides as a new article of manufacture, suitable for combatting flying insects, particularly DDT-resistant mosquitoes, and around the household, an aerosol pressure-pack comprising a pressurized container enclosing an aerosol composition embodying said active compounds.

The specified active compounds are preferably applied to the insect pests or to the environment of the insect pest in the form of emulsions or suspensions. Emulsions or suspensions are prepared by dispersing the active compounds either per se or in the form of an organic solution thereof in water with the aid of a water-soluble non-ionic surfactant. The term 'surfactant' as employed in this specification is used as in Volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the said active compound/s in order to secure better wetting and spreading of the active ingredient in the water vehicle or carrier in which the said active compound/s are insoluble through lowering the surface tension of the water (see also Frear "Chemistry of Insecticides, Fungicides and Herbicides," second edition, p. 280). The surfactants contemplated are the well-known capillary active substances which are non-ionizing (or non-ionic) and which are described in detail in volumes I and II of Schwartz, Perry and Berch's "Surface Active Agents and Detergents," (1958 Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to non-ionizing capillary active substances are incorporated in this specification by reference in order to avoid unnecessary enlargement of this specification. The preferred surfactants are the water-soluble non-ionic surface-active agents set forth in U.S. Patent 2,846,398.

The said active compounds can be dispersed by suitable procedures (e.g. tumbling or grinding) in solid extending agents either of organic or inorganic nature and applied to the insect pests environment in particulate form. Such solid materials include for example, tricalcium phosphate, calcium carbonate, kaolin, bole, charcoal, kieselguhr, talc, bentonite, fuller's earth, pyrophillite, diatomaceous earth, calcined magnesia, volcanic ash, sulfur and the like organic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or by addition of water-soluble non-ionic surfactants the dry particulate solids can be rendered wettable by water so as to obtain stable aqueous dispersions or suspensions suitable for use as sprays. For special purposes the specified active compound/s can be dispersed in a semi-solid extending agent such as petrolatum with or without the aid of solubility promoters and/or non-ionic surfactants.

A concentrate, for example in the form of a spray base or particulate solid base may be provided in such form that, by merely mixing with water or with a solid extender (e.g. powdered clay or talc) or other low-cost readily-available material, an easily prepared spray or particulate solid insecticide for household or agricultural purpose can be produced. In such a concentrate composition, the above specified active compound/s generally will be present in a concentration of 5 to 95 percent by weight, the residue being any one or more of the well-known insecticidal adjuvants, such as the surface-active clays, solvents, diluents, carrier media, adhesives, spreading agents, humectants, and the like.

A particularly useful concentrate ready for mixing with or dispersing in other extending agents is an intimate mixture of an active compound/s as specified with a wetting and dispersing agent in a proportion of 0.1 to 20 parts of surfactant with sufficient of the active compound/s as specified to make 100 parts by weight. Such a concentrate is particularly adapted to be made into a spray for combatting various forms of insect pests by the addition of water thereto. As illustrative of such a concentrate is an intimate mixture of 20 parts by weight of an active compound/s as specified and 5 parts by weight of a wetting and dispersing agent. Another useful concentrate adapted to be made into a spray for combatting insect pests is a solution (preferably as concentrated as possible) of an active compound/s as specified in an organic solvent containing a minor amount (e.g. 0.5 to 15 percent by weight of the weight of the active compound/s) of an emulsifying agent. As illustrative of such a concentrate is a solution of an active compound/s as specified in solvent naphtha or xylene, or a petroleum fraction such as kerosene, containing an emulsifying agent.

In all the various dispersions described hereinbefore for insecticidal purposes, the said active compounds can be advantageously employed in combination with other pesticides, including for example, other insecticides, nematocides, bactericides and herbicides. In this manner it is possible to obtain mixtures which are effective against a wide variety of pests and other forms of noxious life.

Fungicidal compositions containing any of the specified compound/s may be formulated similarly to the insecticidal compositions described above, the fungicidal compositions containing say from 0.001 percent to 50 percent of active compound, depending upon whether the composition is a concentrate or end use composition.

The specified 2-trihalomethyl benzimidazoles, in the case where A is trichloro, employed as a reactant in accordance with the present invention, can be prepared by the reaction of a mono-salt of an appropriately substituted o-phenylenediamine with an alkyl trichloroacetimidate, as illustrated in the following equation:

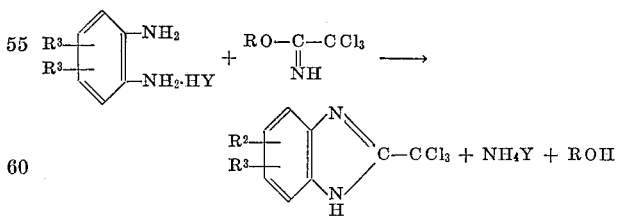

wherein $R^2$ and $R^3$ are as defined above, wherein Y denotes the radical of a mineral acid, preferably hydrochloric acid or sulfuric acid, and wherein R denotes an alkyl group, preferably having fewer than five carbon atoms. The two components are mixed together, conveniently in a suitable solvent or diluent. Suitable solvents are ethers, such as dioxan, diethyl ether, 1,2-dimethoxyethane; esters, for example, ethyl acetate; and alcohols such as methanol or ethanol. The convenient procedure is to add the alkyl trichloroacetimidate gradually to a solution or suspension of the phenylenediamine salt. The preferred temperature of reaction and the duration of reaction varies appreciably with the nature of the substituents denoted by $R^2$ and $R^3$. Electron-donating groups such as alkyl and alkoxy favor the reaction, which then occurs readily at room temperature, in some cases cooling being required as the reaction is exothermic. On the other hand, electron-attracting groups such as halogen retard the reaction and a temperature of 40–50° C. is required for the reaction to be complete within a satisfactory time. The reaction product is isolated and purified by conventional procedure.

Preparation of said 2-trichloromethyl benzimidazoles is illustrated in the following non-limitative practical examples:

EXAMPLE 8

Methyl trichloroacetimidate (0.1 mole) was added to a solution of o-phenylenediamine hydrochloride (0.1 mole) in dry methanol (150 ml.). An exothermic reaction occurred and a solid began to precipitate in half an hour. The reaction was completed in about 2 hours when the mixture was poured into water to give 2-trichloromethyl benzimidazole in 85% yield. This white crystalline solid was recrystallized from glacial acetic acid, dioxan, xylene or chloroform. The material had no melting point up to 360° C. and was identified by infra red (C–Cl peak at 820 cm.$^{-1}$ and ultra violet spectra max at 284 and 224 m$\mu$) with the following microanalytical figures:

Found: C, 40.5; H, 2.4; N, 12.2; Cl, 45.5%. $C_8H_5Cl_3N_2$ requires: C, 40.8; H, 2.1; N, 11.8; Cl, 45.2%.

The methyl trichloroacetimidate starting material can be prepared from trichloroacetonitrile and methanol in the presence of anhydrous potassium carbonate by the method of Cramer, Mer., 1958, 91, 1049. The product so prepared was obtained in 90% yield and had B.P. 148° C., $n_D^{25}$—1.4785
$d_{25}$—1.45.

EXAMPLE 9

4-chloro-o-phenylenediamine monohydrochloride (0.02 mole) was reacted with methyl trichloroacetimidate (0.02 mole) by allowing them to stand overnight in dry methanol at room temperature. This mixture on quenching gave crude 2 - trichloromethyl-5(6)-chlorobenzimidazole in 55% yield with 5% contaminate. The latter was removed by dissolving the mixture in acetic acid, filtration of the insoluble contaminate and aqueous quenching to give the desired compound. Several recrystallizations from xylene gave an analytically pure white crystalline material, M.P. 235° C. (I.R. spectrum aliphatic C–Cl 820 cm.$^{-1}$ aromatic C–Cl 810 cm.$^{-1}$).

Found: C, 36.1; H, 1.8; N, 10.4; Cl, 52.3%. $C_8H_4Cl_4N_2$ requires: C, 35.7; H, 1.5; N, 10.4; Cl, 52.4%.

The 4 - chloro-o-phenylenediamine monohydrochloride starting material can be prepared from the purified base by addition of hydrochloric acid in methanol and precipitation of the salt with petroleum ether.

EXAMPLE 10

Methyl trichloroacetimidate (0.01 mole) was added to a suspension of 4,5-dimethyl-o-phenylenediamine monohydrochloride (0.01 mole) in dimethoxyethane (80 ml.). No apparent reaction took place and the mixture was allowed to stand at room temperature for 6 days. At the end of this period, filtration of the insoluble materials showed it to contain about 50% of the starting hydrochloride. Addition of petroleum ether (40–60° C.) to the filtrate precipitated an oily material, which was filtered off and the filtrate was evaporated to give crude 2-trichloromethyl - 5,6 - dimethylbenzimidazole in 35% yield. The crude material was recrystallized three times from benzene to give white crystalline material having M.P. 190° C. After 4 hours drying at 80° C. under vacuum, analysis showed the material to contain 1/3 molecule of benzene of crystallization.

Found: C, 50.5; H, 3.8; N, 9.5; Cl, 36.9%. $C_{10}H_9N_2Cl_3 \cdot 1/3 C_6H_6$ requires: C, 49.8; H, 3.8; N, 9.6; Cl, 36.8%. After further two recrystallizations from benzene the material with M.P. 190° C. was dried for four hours at 100° C. under vacuum.

Analysis showed that it now contained 1/6 molecule of benzene of crystallization. Found: C, 47.6; H, 3.7; N, 10.1; Cl, 38.7%. $C_{10}H_9N_2Cl_3 \cdot 1/6 C_6H_6$ requires: C, 47.7; H, 3.7; N, 10.1; Cl, 38.5%.

The 4,5-dimenthyl-o-phenylenediamine monohydrochloride starting material can be prepared by the addition of hydrochloric acid to the base dissolved in ethyl acetate, followed by precipitation of the salt with petroleum ether. This starting material has a M.P. 225° C. and has only slight solubility in the usual solvents.

EXAMPLE 11

Methyl trichloroacetimidate (26.0 g., 0.15 mole) was added to a solution of 3,4-diaminotoluene hydrochloride (24.0 g., 0.15 mole) in 1,2-dimethoxyethane (400 ml.) at room temperature, and left overnight. Ammonium chloride was then filtered off and petroleum ether (B.P. 40–60° C.) was added to the filtrate to precipitate by-products. These were filtered off and the solution was evaporated to give 5-methyl-2-trichloromethyl benzimidazole in 60% yield. After recrystallization from benzene, the solid has M.P. 187° C.

Found: C, 42.9; H, 2.9; N, 11.0%. $C_9H_7N_2Cl_3$ requires: C, 43.2; H, 2.8; N, 11.2%.

The specified 2-trihalomethyl benzimidazoles, in the case where A is monochlorodifluoromethyl or monofluorodicholoromethyl, employed as a reactant in accordance with the present invention, can be prepared by the method which comprises reacting an appropriate o-phenylenediamine with monochlorodifluoroacetic acid or monofluorodichloroacetic acid. Reaction of the o-phenylenediamine and either of the specified acids can be effected by bringing the reactants together, suitably with the application of heat. This is conveniently effected in an aqueous reaction medium, or in a dilute mineral acid solution such as 4 N hydrochloric acid, preferably by refluxing for a suitable period. The reaction product can be isolated by addition of a base, such as 10% sodium carbonate solution, and, if desired, purified by conventional procedures, the isolated material then being used for the purpose of the invention. Alternatively, the reaction mass resulting from the preparation of the specified 2-trihalomethyl benzimidazole may be employed in the process of the invention, without isolating the 2-trihalomethyl benzimidazole reaction product from the reaction mass.

Preparation of the specified 2-trihalomethyl benzimidazoles is illustrated in the following non-limitative practical examples.

EXAMPLE 12

2-monochlorodifluoromethyl benzimidazole was prepared by adding 2-monochlorodifluoroacetic acid (65 g.) to o-phenylenediamine (54 gm.) in 4 N hydrochloric acid (500 ml.) and the solution refluxed for one-half to 3 hours. Alternatively, the same amount of monochlorodifluoroacetic acid is heated with o-phenylenediamine without dilution or in water without the mineral acid. At the end of the reflux period the solution is cooled and carefully neutralized with 10% sodium carbonate solution. The resulting precipitate is filtered off and is essentially pure 2-monochlorodifluoromethyl benzimidazole, M.P. 212° C.

EXAMPLE 13

2-monochlorodifluoromethyl-5(6)-chlorobenzimidazole was prepared by reacting 2-monochlorodifluoroactic acid with 4-chloro-o-phenylenediamine as generally described in Example 12.

EXAMPLE 14

2 - monochlorodifluoromethyl-5,6-dichlorobenzidazole was prepared by reacting 2-monochlorodifluoroacetic acid with 4,5-dichloro - o - phenylenediamine as generally described in Example 12.

EXAMPLE 15

2-monochlorodifluoromethyl-5,6-dimethylbenzimidazole was prepared by reacting 2-monochlorodifluoroacetic acid with 4,5-dimethyl-o-phenylenediamine as generally described in Example 12.

EXAMPLE 16

2 - monochlorodifluoromethyl - 5-methylbenzimidazole was prepared by reacting 2-monochlorodifluoroacetic acid with 3,4-diaminotoluene, as generally described in Example 12.

The embodiments of the invention in which an exclusive property or privilege is claimed are defined as follows:

1. A N,N-disubstituted-benzimidazole-2-carbonamidine of the formula:

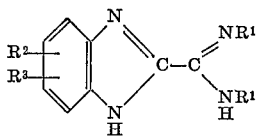

wherein $R^1$ is selected from the group consisting of alkyl of not more than twelve carbon atoms, thienyl, furfuryl, phenyl and substituted phenyl of not more than two substituents selected from the group consisting of chlorine, bromine, nitro, alkyl of not more than four carbon atoms and alkoxy of not more than four carbon atoms and wherein $R^2$ and $R^3$ are independently selected from the group consisting of hydrogen, chlorine, bromine, nitro, alkyl or not more than four carbon atoms and alkoxy of not more than four carbon atoms.

2. A carbonamidine in accordance with claim 1 wherein $R^2$ and $R^3$ are hydrogen.

3. A carbonamidine in accordance with claim 1 which is N,N-dimethyl-2-benzimidazole carbonamidine.

4. A carbonamidine in accordance with claim 1 which is N,N-dimethyl-2-(5-chlorobenzimidazole) carbonamidine.

5. A carbonamidine in accordance with claim 1 which is N,N-difurfuryl-2-benzimidazole carbonamidine.

6. A process for the preparation of a N,N-disubstituted benzimidazole-2-carbonamidine of the formula

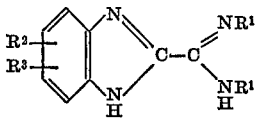

wherein $R^1$ is selected from the group consisting of alkyl of not more than twelve carbon atoms, thienyl, furfuryl, phenyl and substituted phenyl of not more than two substituents selected from the group consisting of chlorine, bromine, nitro, alkyl of not more than four carbon atoms and alkoxy of not more than four carbon atoms and wherein $R^1$ and $R^3$ are independently selected from the group consisting of hydrogen, chlorine, bromine, nitro, alkyl of not more than four carbon atoms and alkoxy of not more than four carbon atoms; which comprises reacting under basic conditions a trihalomethyl benziomidazole of the formula:

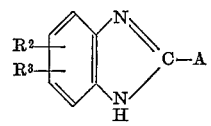

wherein $R^2$ and $R^3$ are as defined above and A is selected from the group consisting of trichloromethyl, monochlorodifluoromethyl and monofluorodichloromethyl; with a primary amine of the formula:

wherein $R^1$ is as defined above.

7. A process in accordance with claim 6 wherein the trihalomethyl benzimidazole is reacted with the primary amine on a lower alkanol solution.

References Cited

UNITED STATES PATENTS

| | | | |
|---|---|---|---|
| 3,023,103 | 2/1962 | Dersch et al. | 260—309.2 |
| 3,365,462 | 1/1968 | Holan et al. | 260—309.2 |

OTHER REFERENCES

Easson Chem. Abst. vol. 55, 16523–6 (1961) QD1.A 51.

Holan et al. II (Holan and Samuel) Jour. Chem. Soc. (C) 1967, p. 25–29. QD1.C6.

HENRY R. JILES, Primary Examiner

NATALIE TROUSOF, Assistant Examiner

U.S. Cl. X.R.

424—273; 260—453